(12) United States Patent
Oyanagi

(10) Patent No.: US 7,853,814 B2
(45) Date of Patent: Dec. 14, 2010

(54) METHOD AND SYSTEM FOR EXECUTING A POWER-CUTOFF-SPECIFIC PROCESS WITHIN A SPECIFIC PROCESSOR OF A MULTIPROCESSOR SYSTEM

(75) Inventor: Makoto Oyanagi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1049 days.

(21) Appl. No.: 11/591,309

(22) Filed: Oct. 31, 2006

(65) Prior Publication Data
US 2007/0106918 A1 May 10, 2007

(30) Foreign Application Priority Data
Nov. 7, 2005 (JP) ............... 2005-322595

(51) Int. Cl.
G06F 1/00 (2006.01)
G06F 1/26 (2006.01)
G06F 1/32 (2006.01)
G06F 15/16 (2006.01)
G06F 13/24 (2006.01)

(52) U.S. Cl. .................. 713/323; 713/300; 713/320; 709/208; 710/260

(58) Field of Classification Search ............. 713/300, 713/320, 323; 709/208; 710/260
See application file for complete search history.

(56) References Cited

U.S. PATENT DOCUMENTS 5,410,713 A * 4/1995 White et al. ............... 713/330
5,857,090 A * 1/1999 Davis et al. ............... 703/25
5,933,649 A * 8/1999 Lim et al. .................. 713/322
6,105,142 A * 8/2000 Goff et al. ................. 713/324
6,189,065 B1 * 2/2001 Arndt et al. ............... 710/260
6,526,514 B1 * 2/2003 Nguyen et al. ............ 713/300
6,678,830 B1 * 1/2004 Mustafa et al. ........... 713/310
6,772,241 B1 * 8/2004 George et al. ............. 710/36
2005/0021871 A1 * 1/2005 Georgiou et al. .......... 709/250
2009/0049323 A1 * 2/2009 Imark et al. ............... 713/375

FOREIGN PATENT DOCUMENTS

| JP | 62-162728 A | 10/1987 |
| JP | 06-004418 | 1/1994 |
| JP | 06-309288 | 11/1994 |
| JP | 07-152844 A | 6/1995 |
| JP | 11-110308 | 4/1999 |
| JP | 2003-005871 A | 1/2003 |
| JP | 2005-267635 | 9/2005 |

\* cited by examiner

*Primary Examiner*—Ji H Bae
(74) *Attorney, Agent, or Firm*—Nutter McClennen & Fish LLP; John J. Penny, Jr.

(57) ABSTRACT

A multi processor system having a first processor; and one or more second processors is provided. Each of the one or more second processors is connected to the first processor by a dedicated interrupt signal line. Upon receiving a first interrupt signal indicating a power cutoff event, the first processor sends via the dedicated interrupt signal line a second interrupt signal to at least one second processor among the one or more second processors.

6 Claims, 3 Drawing Sheets

METHOD AND SYSTEM FOR EXECUTING A POWER-CUTOFF-SPECIFIC PROCESS WITHIN A SPECIFIC PROCESSOR OF A MULTIPROCESSOR SYSTEM

CROSS-REFERENCE TO RELATED APPLICATIONS

The present application claims the priority based on Japanese Patent Application No. 2005-322595 filed on Nov. 7, 2005, the disclosure of which is hereby incorporated by reference in its entirety.

BACKGROUND OF THE INVENTION

1. Field of the Invention

The present invention relates to an information processing device having a plurality of processors, and specifically relates to an information processing device which supplies power from a capacitor when a sudden power supply cutoff such as a power outage occurs, and performs a power-cutoff-specific process such as data saving or the like.

2. Description of the Related Art

In recent years, there have been proposals of various information processing devices, such as computers and printers, that perform a specific process to be executed when the power supply is abruptly cut off. Examples of such specific process (hereafter called "power-cutoff-specific process") includes saving specified data in a flash memory or the like.

JP11-110308A proposes to equip an information processing device with a capacitor that will supply power to a processor for the time needed for the processor to perform the power-cutoff-specific process, when a sudden power supply cutoff occurs such as when the user unplugs the power cable during operation or when a power outage occurs.

Some information processing devices have multiple processors. However, there have not been any particular proposals or solutions about how to execute a power-cutoff-specific process in the multi-processor devices.

SUMMARY OF THE INVENTION

Accordingly, an object of the present invention is to provide technology for completing a power supply cutoff process in a multi processor device when a sudden power supply cutoff occurs.

According to an aspect of the present invention, there if provided a multi processor system comprising a first processor, and one or more second processors. Each of the one or more second processors being connected to the first processor by a dedicated interrupt signal line. Upon receiving a first interrupt signal indicating a power cutoff event, the first processor sends via the dedicated interrupt signal line a second interrupt signal to at least one second processor among the one or more second processors.

With this multi processor system, it is possible to decrease the power required by the overall multi processor system if the second processors shift their operating mode to the low power consumption mode upon receiving the second interrupt signal.

When a sudden power supply cutoff occurs, the power consumption volume of the overall multi processor system decreases, so with a backup power supply such as capacitor that supplies power to the multi processor system when this power supply cutoff occurs, it is possible to significantly suppress the shortening of the time for which power can be supplied. As a result, with the multi processor system, it is possible to complete all the necessary processes set in advance that are to be performed during power supply cutoff occurrence without using a high capacity capacitor or the like.

Note that in addition to the constitution as the multi processor system noted above, the present invention can also be constituted as a printing device equipped with the multi processor system noted above. Also, there is no restriction to the aspects of the device invention of the multi processor system and printing device, and it is also possible to realize this as a method invention of an interrupt signal sending method.

These and other objects, features, aspects, and advantages of the present invention will become more apparent from the following detailed description of the preferred embodiments with the accompanying drawings.

DESCRIPTION OF THE PREFERRED EMBODIMENT

Preferred embodiments of the present invention are described in the following sequence.

A. First Embodiment:
  A1. Printer Constitution:
  A2. Power Outage Process:
  A3. Effect of the Embodiment:

B. Second Embodiment:
  B1. Power Outage Process:
  B2. Effect of the Embodiment:

C. Variation Examples:

A. First Embodiment

A1. Printer Constitution

Figure 1:
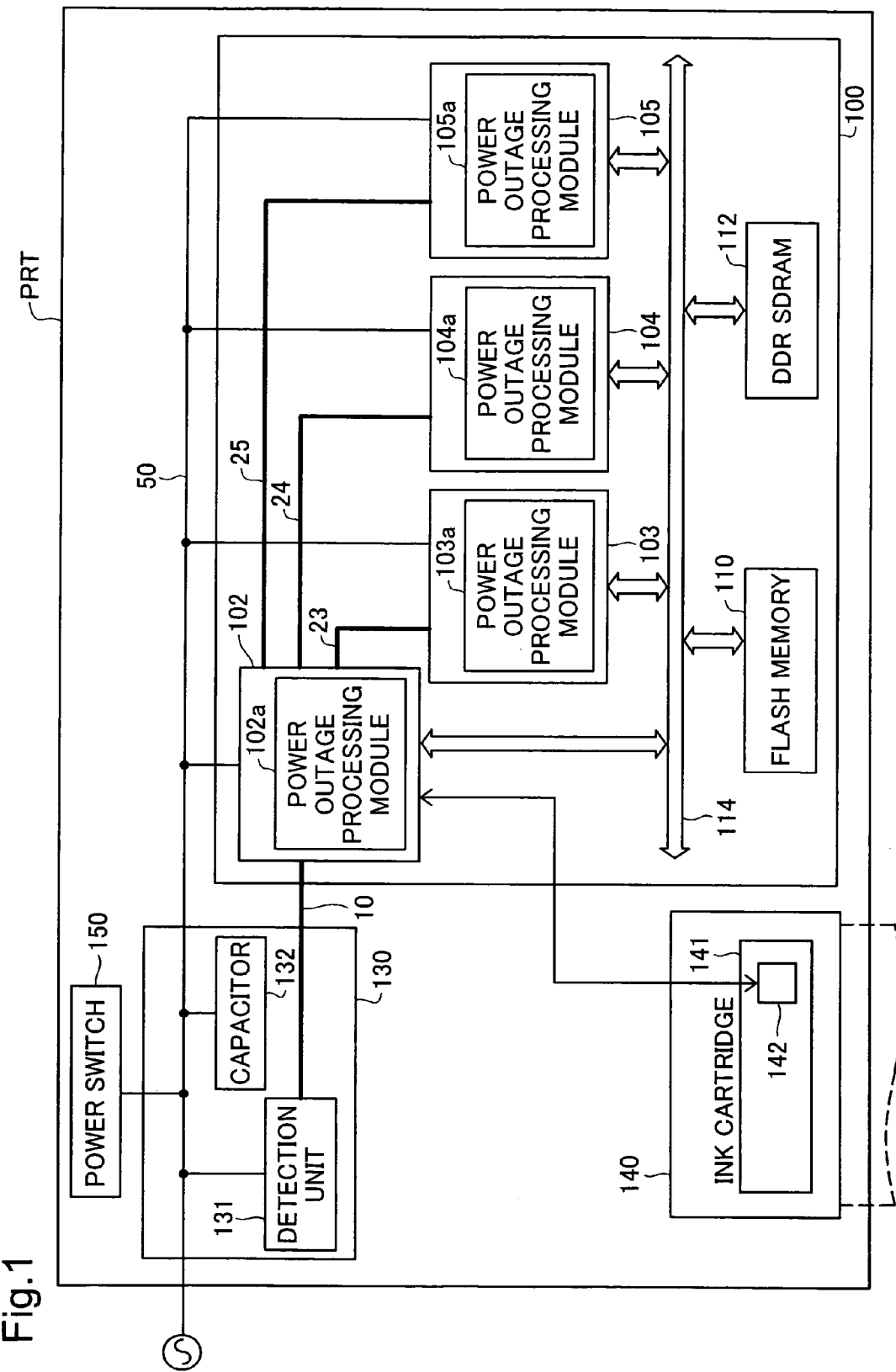
FIG. 1 is an explanatory drawing showing the summary constitution of the printer as one embodiment of the present invention.

FIG. 1 is an explanatory drawing showing the constitution of a printer as one embodiment of the present invention.

The printer PRT includes a printer engine 140 having a mechanism for printing on paper, a control unit 100 for controlling the printer engine 140, and a power supply unit 130 for supplying power to the printer engine 140 and the control unit 100.

The printer engine 140 is equipped with an ink cartridge 141 having an IC (Integrated Circuit) chip 142.

The power supply unit 130 is equipped with a detection unit 131 for detecting external power supply cutoff and a capacitor 132. The capacitor 132 is charged by the supply of power from the external power supply during operation of the printer PRT. The capacitor 132 is able to supply power to the printer engine 140 and the control unit 100 in place of the external power supply when a sudden power supply cutoff occurs due to a power outage, the user unplugging the power cable (not illustrated), or the like. In place of the capacitor 132, other types of backup power supply devices, such as a secondary battery, may be used. However, the capacitor 132 is preferable cost wise.

Note that a power switch 150 is connected to the power supply unit 130, and when the power switch 150 is turned off by the user, it is possible to stop the supply of power.

The control unit 100 is equipped with a main CPU 102, three sub CPUs 103 to 105, a flash memory 110, and a DDR-SDRAM 112, and each of these is connected by an internal bus 114. Note that this control unit 100 is integrated on one semiconductor substrate.

A computer program for performing power outage processing for the main CPU 102 is stored in the flash memory 110, and when this program is loaded into the DDR-SDRAM 112, the main CPU 102 functions as a power outage processing module 102a by executing this program.

Another computer program for performing power outage processing for the sub CPU 103 is stored in the flash memory 110, and when this program is loaded into the DDR-SDRAM 112, the sub CPU 103 functions as a power outage processing module 103a. In the same way, the sub CPU 104 and the sub CPU 105 respectively function as a power outage processing module 104a and a power outage processing module 105a.

Note that the main CPU 102 and the sub CPUs 103-105 have plural operating modes including a normal mode and a low power consumption mode. The normal mode refers to a mode that is able to execute computer programs to perform specified processes. The required power of each CPU for this normal mode is relatively high.

The low power consumption mode refers to a mode for which the CPU essentially stops, and with which programs are not executed without shifting to the normal mode. The required power of each CPU for this low power consumption mode is much lower than that for the normal mode.

Each constitutional element above is connected to the power supply unit 130 by a power supply line. For example, the main CPU 102 and the sub CPUs 103 to 105 are connected to the power supply unit 130 by the power supply line 150.

The detection unit 131 and the main CPU 102 are connected by a dedicated interrupt signal line 10. The main CPU 102 is also connected to the sub CPUs 103, 104, 105 by dedicated interrupt signal lines 23, 24, and 25, respectively.

Note that the control unit 100 corresponds to the multi processor system in the claims, the main CPU 102 corresponds to the first processor in the claims, and the sub CPUs 103 to 105 correspond to the second processors.

Here, we will give a simple description of the operation of each CPU during printing with the printer PRT.

The main CPU 102 functions as the print control unit that does comprehensive control of the printer PRT during printing. In specific terms, this print control unit reads image files specified by the user from a recording medium such as a memory card or the like (not illustrated) that is inserted in the printer PRT, controls each sub CPU 103 to 105, and executes processing such as color conversion described later.

The sub CPU 103 functions as a function unit that performs color conversion during printing. In specific terms, this function unit converts RGB color image data to another image data expressed by a combination of ink color gradation values for C (cyan), M (magenta), Y (yellow), and K (black) inks according to instructions from the main CPU 102.

During printing, the sub CPU 103 functions as a function unit that converts a resolution of the image data after color conversion to another resolution (printing resolution) with which the printer PRT prints the image.

During printing, the sub CPU 105 functions as a function unit that performs halftone processing for converting image data after resolution conversion to dot data expressed by dots being on or off.

Then, the print control unit (realized by the main CPU 102) drives the printer engine 140 including a printing head (not illustrated), a carriage drive motor (not illustrated), a paper feed motor (not illustrated) or the like based on the dot data to have printing executed.

The print control unit holds information related to printing in the DDR-SDRAM 112 such as ink consumption volume and print time (hereafter called "printing related information").

When the power switch 150 is turned off by the user, or when a sudden power supply cutoff occurs such as a power outage, a power-cutoff-specific process is performed by the power outage processing module 102a.

The "power-cutoff-specific process" in this embodiment is executed as follows. Specifically, the power outage processing module 102a first stops the drive of each type of motor within the printer engine 140, and next, reads the printing related information from the memory (DDR-SDRAM) 112, stores the ink consumption volume or the remaining ink volume in the IC chip 142 of the ink cartridge 140, and stores the printing related information in the flash memory 110.

The above power-cutoff-specific process, including storage of the ink volume in the IC chip 142, and storage of the printing related information in the flash memory 110, is executed because due to stopping of the supply of power, the printing related information will soon be deleted from the DDR-SDRAM 112, and it will become impossible to manage the ink volume.

Here, when the power switch 150 is turned off by the user, the power supply unit 130 continues supplying power to each constitutional element until the power-cutoff-specific process is completed, and after the power-cutoff-specific process is completed, is made to stop supply power.

Meanwhile, when a sudden power supply cutoff like a power outage occurs, the power may be supplied to each of the constitutional elements from the capacitor 132. Therefore, when a power cutoff occurs during execution of printing related processes such as the color conversion described above by each of the sub CPUs 103 to 105, the capacitor 132 may supply power not only to the main CPU 102 but also to the sub CPU 103 to 105.

However, with this embodiment, the capacitor 132 is designed such that it is possible to supply enough power for the main CPU 102 to complete the power-cutoff-specific process during a short time (about 300 to 400 ms) immediately after the sudden power supply cutoff occurs, but the capacitor 132 dose not have enough capacity to supply power also to the sub CPUs for executing the power-cutoff-specific processes.

If the power supply to the sub CPUs 103 to 105 is maintained after the sudden power supply cutoff, the time for which it is possible to supply power to the main CPU 102 becomes shorter. As a result, there is a risk that the supply of power to the main CPU 102 will stop before the power-cutoff-specific process is completed, and that storage of the ink volume in the IC chip 142 or storage of the printing related information to the flash memory 110 will be incomplete.

In light of this, the power outage processing of the first embodiment described below is executed such that all of the power-cutoff-specific process is to be completed by the power outage processing module 102a even if a sudden power supply cutoff occurs during execution of printing related processing by the sub CPUs 103 to 105.

A2. Power Outage Process

It is assumed here that the main CPU 102 and the sub CPUs 103 to 105 are operating in the normal mode to execute the printing related processes described above. When a power outage occurs and the power supply cutoff is detected by the detection unit 131 shown in FIG. 1, supplying of power starts from the capacitor 132 to the main CPU 102 and each sub CPU 103 to 105, and the power outage processing is executed at the printer PRT.

Figure 2:
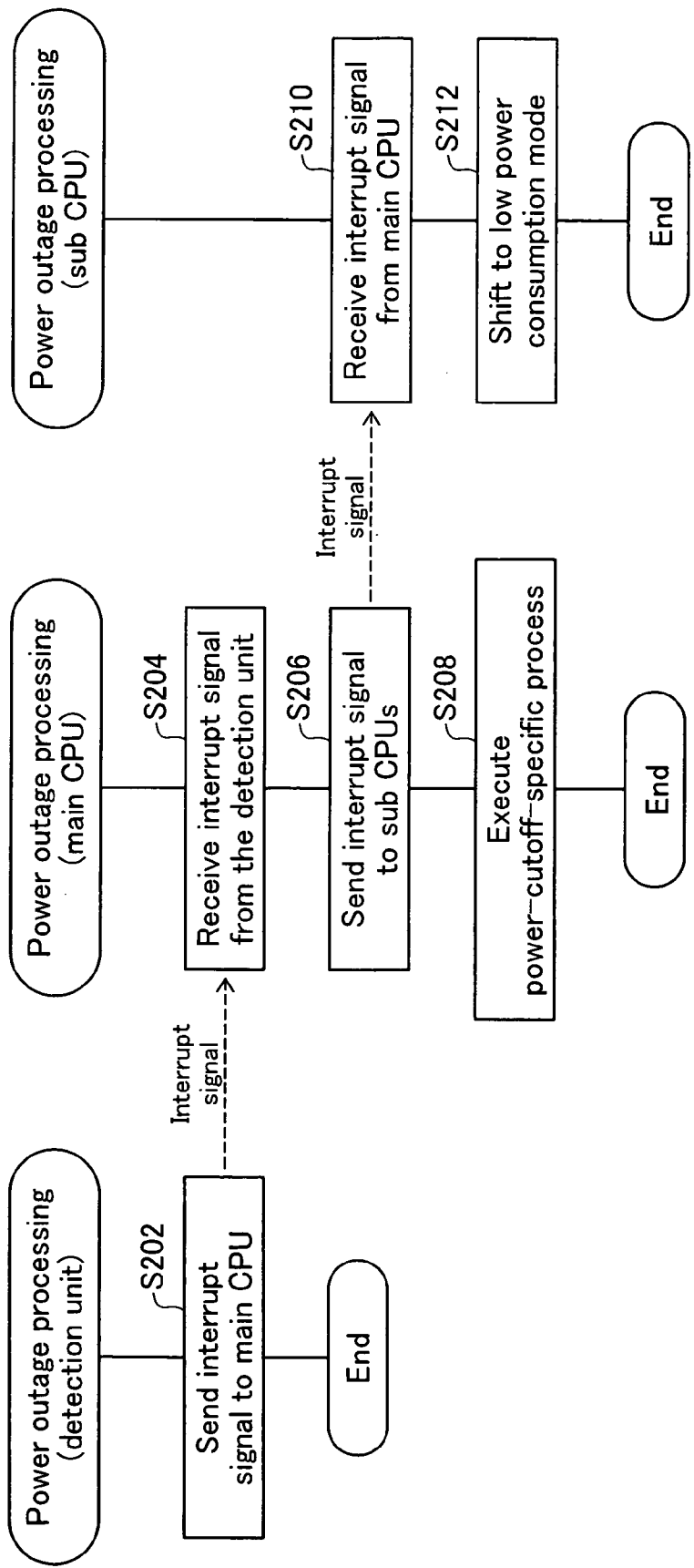
FIG. 2 is a flow chart showing the power outage processing procedure for the first embodiment.

FIG. 2 is a flow chart showing the power outage processing procedure for the first embodiment. In FIG. 2, the left side flow chart shows the power outage processing procedure for the detection unit 131, the middle flow chart shows the power outage processing procedure for the main CPU 102, and the right side flow chart shows the power outage processing procedure for each sub CPU 103 to 105.

When the power outage processing shown in FIG. 2 starts, first, the detection unit 131 send to the main CPU 102 an interrupt signal indicating occurrence of a power supply cutoff event via the dedicated interrupt signal line 10 (step S202).

At the main CPU 102, when the power outage processing module 102*a* receives the interrupt signal from the detection unit 131 (step S204), it sends the interrupt signal indicating the occurrence of the power supply cutoff event to the sub CPUs 103, 104, 105 via the dedicated interrupt signal lines 23, 24, 25, respectively (step S206).

Note that the interrupt from the detection unit 131 is NMI (non-maskable interrupt), and at the main CPU 102, the interrupt signal sending process to each sub CPU 103 to 105 (step S206) is performed with the highest priority.

Meanwhile, at the sub CPU 103, when the power outage processing module 103*a* receives the interrupt signal from the main CPU 102 (step S210), the sub CPU 103 shifts its operation mode from the normal mode to the low power consumption mode (step S212). Therefore, with the sub CPU 103, the process such as the color conversion is forcibly ended, and there is a sharp decrease in the required power.

Note that at the sub CPU 104 and the sub CPU 105 as well, the respective power outage processing module 104*a* and the power outage processing module 105*a* perform the previously described step S210 and step S212, and there is a sharp decrease in the required power.

The interrupts from the main CPU 102 to the sub CPUs are NMIs (non-maskable interrupts), and at each sub CPU 103 to 105, the shift to the low power consumption mode (step S212) is performed with the highest priority.

Returning to the main CPU 102, after sending the interrupt signal to each sub CPU 103 to 105 with the process of step S206, the power outage processing module 102*a* performs the power-cutoff-specific process described above (step S208).

With the power outage process above, each sub CPU 103 to 105 shifts to the low power consumption mode and there is a sharp decrease in the required power. Therefore, the power consumption volume of each sub CPU 103 to 105 rapidly decreases while the power outage processing module 102*a* performs the power-cutoff-specific process, so there is significant suppression of the shortening of the time for which power can be supplied by the capacitor 132. As a result, the power outage processing module 102*a* is able to complete all the power-cutoff-specific process, and it is possible to store the ink volume in the IC chip 42 and to store the printing related information in the flash memory 110.

A3. Effect of the Embodiment

As described above, with the control unit 100 at the printer PRT, the main CPU 102 is connected to the sub CPUs 103, 104, and 105 by the dedicated interrupt signal lines 23, 24, and 25, respectively. Therefore, when the power outage processing module 102*a* receives the power supply cutoff interrupt signal from the detection unit 131, the module 102*a* is able to send interrupt signals to the sub CPUs 103 to 105.

Upon receiving the interrupt signal from the main CPU 102, each sub CPU 103 to 105 shifts the operating mode from the normal operating mode to the low power consumption mode through the top priority process. Therefore, it is possible to make the required power for each sub CPU 103 to 105 very low while the power outage processing module 102*a* of the main CPU 102 performs the power-cutoff-specific process.

As a result, the volume of power consumed at each sub CPU 103 to 105 becomes very small, preventing excessive shortening of the time for which the capacitor 132 can supply power to the CPUs, and the power outage processing module 102*a* can complete all the power-cutoff-specific process accordingly.

B. Second Embodiment

With the first embodiment described above, the power-cutoff-specific process was performed by the main CPU 102, but with the second embodiment, the sub CPU 103 performs the power-cutoff-specific process. The purpose of this is to have the capacity of the capacitor be smaller than the capacity of the first embodiment.

In some cases, the power required for the normal mode is smaller for the sub CPU 103 than it is for the main CPU 102. In those cases, the overall required power during the power outage processing can be reduced by shifting the main CPU 102 to the low power consumption mode and also having the power-cutoff-specific process performed by the sub CPU 103 in place of the main CPU 102. It will be possible to make the capacity of the capacitor 132 even lower.

Note that the constitution of the printer is the same as that of the first embodiment, so a description is omitted here. However, as described above, compared to the main CPU 102, the sub CPU 103 has lower required power for the normal mode.

B1. Power Outage Process

It assumed here that, when starting up the printer PRT, the power outage processing module 102*a* of the main CPU 102 sends to the sub CPU 103, via the internal bus 114, the computer program (or its start address) for executing the power supply cutoff process, a storage start address of the printing related information in the DDR-SDRAM 112, and a data size of the printing related information. Therefore, at the sub CPU 103, the power outage processing module 103*a* is able to perform the power supply cutoff process by executing the program for the power supply cutoff process.

The capacitor 132 used in the second embodiment is designed such that it is possible to supply enough power for the sub CPU 103 to complete the power-cutoff-specific process during a short time (about 300 to 400 ms) immediately after the sudden power supply cutoff occurs, but the capacitor 132 dose not have enough capacity to supply power also to the other CPUs for executing the power-cutoff-specific processes. Note that the other conditions are the same as for the first embodiment, so the description is omitted here.

When a power outage occurs and the detection unit 131 shown in FIG. 1 detects the power supply cutoff, the power outage processing is executed at the printer PRT. Upon occurrence of the power supply cutoff occurrence, the capacitor 132 starts to supply power to the main CPU 102 and the sub CPU 103 to 105.

Figure 3:
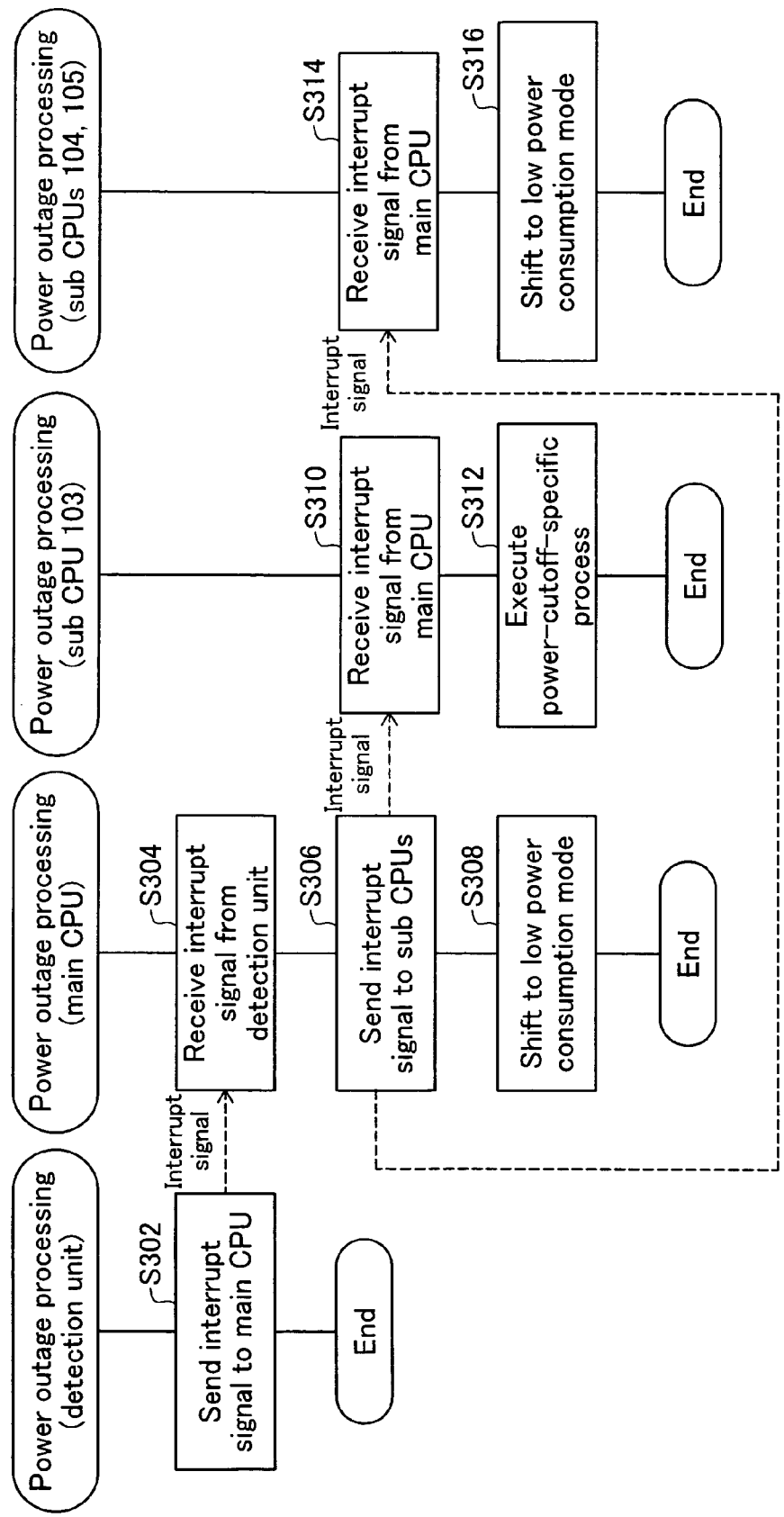
FIG. 3 is a flow chart showing the power outage processing procedure for the second embodiment.

FIG. 3 is a flow chart showing the power outage processing procedure for the second embodiment. The flow chart at the farthest left side shows the power outage processing procedure at the detection unit 131, the flow chart second from the left shows the power outage processing procedure for the main CPU 102, the flow chart third from the left shows the power outage processing procedure for the sub CPU 103, and the flow chart farthest to the right shows the power outage processing procedure of the sub CPU 104 and the sub CPU 105.

When the power outage process shown in FIG. 3 starts, first, the detection unit 131 sends the interrupt signal indicating occurrence of a power supply cutoff event to the main CPU 102 via the dedicated interrupt signal line 10 (step S302).

At the main CPU 102, when the power outage processing module 102a receives the interrupt signal from the detection unit 131 (step S304), it sends the interrupt signal indicating the occurrence of the power supply cutoff event to the sub CPUs 103, 104, 105 via the dedicated interrupt signal lines 23, 24, 25, respectively (step S306).

Note that the interrupt from the detection unit 131 is NMI, and at the main CPU 102, the process of sending the interrupt signal to each sub CPU 103 to 105 (step S306) is performed with the highest priority.

In the first embodiment described above, after the power outage processing module 102a sends the interrupt signal to each sub CPU 103 to 105, the module 102a itself executes the power-cutoff-specific process. In the second embodiment, after the power outage processing module 102a sends the interrupt signal to each sub CPU 103 to 105, the modules 102a shifts the operating mode of the main CPU 102 from the normal mode to the low power consumption mode (step S308). Therefore, with the main CPU 102, the processes relating to print control are forcibly ended, and there is a sharp decrease in the required power.

Meanwhile, with the sub CPU 104 and the sub CPU 105, the processes of step S314 and step S316 are performed. Note that these steps S314 and S316 are the same as the step S210 and step S212 in FIG. 2, so their description is omitted here. Then, as a result of the processes of step S314 and step S316, with the sub CPU 104 and the sub CPU 105, the resolution conversion and the halftone processing are forcibly ended, and there is a sharp decrease in the required power.

Note that the interrupt from the main CPU 102 is NMI, and the sub CPU 104 and the sub CPU 105 shift to the low power consumption mode (step S316) with the highest priority.

Meanwhile, at the sub CPU 103, when the power outage processing module 103a receives the interrupt signal sent from the main CPU 102 (step S310), the printing related information is read from the DDR-SDRAM 112 based on the pre-notified address and data size, and the previously described power supply cutoff process is performed (step S312).

With the power outage process described above, the main CPU 102, the sub CPU 104, and the sub CPU 105 shift to the low power consumption mode and there is a sharp decrease in the required power. Therefore, there is a sharp reduction in the consumed power volume with these CPUs, so it is possible to significantly suppress the shortening of the time for which supplying of power is possible by the capacitor. As a result, the power outage processing module 103a is able to complete all the power-cutoff-specific process, and it is possible to store the ink volume in the IC chip 142 and also to store the printing related information in the flash memory 110.

B2. Effect of the Embodiment

As described above, with the main CPU 102, when the power outage processing module 102a receives the interrupt signal indicating the power supply cutoff from the detection unit 131, the module 102a sends the interrupt signal indicating the power supply cutoff to each sub CPU 103 to 105, and shifts to the low power consumption mode. Also, at the sub CPU 104 and the sub CPU 105, when the power outage processing module 104a and the power outage processing module 105a receive interrupt signals from the main CPU 102, the sub CPU 104 and the sub CPU 105 respectively shift operating mode from the normal mode to the low power consumption mode by the top priority process.

Therefore, with the sub CPU 103, when the power outage processing module 103a performs power-cutoff-specific process, it is possible to make the required power of the main CPU 102, the sub CPU 104, and the sub CPU 105 very low. As a result, the power volume consumed at these CPUs is very low, so it is possible to significantly suppress the shortening of the time for which supplying of power by the capacitor is possible, and it is possible for the power outage processing module 103a to complete all the power-cutoff-specific process.

The power-cutoff-specific process is performed by the sub CPU 103 which has a lower required power in the normal mode than the main CPU 102. Therefore, compared to when the main CPU 102 performs the power-cutoff-specific process, it is possible to use a capacitor with a lower capacity, and it is possible to suppress a rise in the manufacturing cost of the printer PRT.

C. Variation Examples

Note that the present invention is not limited to the embodiments and aspects described above, and can be implemented with various aspects in a scope that does not stray from its key points, and the variation examples below are possible, for example.

C1. Variation Example 1

With the first embodiment and second embodiment described above, the power outage processing is performed when a power outage occurs, but the present invention is not limited to the process upon the power outage occurrence, and can also be used in cases of sudden power supply cutoff such as when the power cable is unplugged by the user during operation by the printer PRT.

C2. Variation Example 2

With the second embodiment described above, the CPU that performs power-cutoff-specific process was the sub CPU 103, but instead of the sub CPU 103, it is also possible to have the power-cutoff-specific process performed by the sub CPU 104 or the sub CPU 105. By having the power-cutoff-specific process performed by the sub CPU which has lower power consumption volume in the normal mode than that of the main CPU, it is possible to use a capacitor with lower capacity.

C3. Variation Example 3

With the first embodiment and second embodiment described above, the power outage processing module 102a sent interrupt signal to all the sub CPUs, but it is also possible to send interrupt signals only to a portion of the sub CPUs that do not perform power-cutoff-specific process.

In specific terms, for example, the power outage processing module 102a may confirm the operating mode of each sub CPU 103 to 105 before sending the interrupt signals, and then selectively send interrupt signals only to the sub CPUs operating in the normal mode. Even when working in this way, the CPUs other than the CPUs performing the power-cutoff-specific process are all shifted into the low power consumption mode, so it is possible to significantly suppress the shortening of the time for which supplying of power is possible by the capacitor 132.

C4. Variation Example 4

With the first embodiment and second embodiment described above, the sub CPUs 103 to 105 perform processing related to printing, such as color conversion, resolution conversion, and halftone processing, but this is not limited to these processes, and for example, other processes can also be performed such as gamma correction processing, and expansion processing of images compressed in JPEG (Joint Photographic Experts Group) format.

C5. Variation Example 5

With the first embodiment and second embodiment described above, the CPUs other than the specific CPU performing the power-cutoff-specific process were shifted from the normal mode to the low power consumption mode, but the present invention is not limited to this configuration. The CPUs that are not supposed to perform the power-cutoff-specific process may shift from the normal mode to a stop mode or a dead mode where no power is consumed. In this case, the stop mode corresponds to the low power consumption mode in the claims. The low power consumption mode defined in the first and second embodiments has the advantage that if the duration of the abrupt power off is very short (say, 100 ms) and the power resumes soon, the CPUs operating under the low power consumption mode will be able to shift back to the normal mode to continue the processing.

C6. Variation Example 6

The power outage processing module 102a in the first embodiment described above executed the power-cutoff-specific process (step S208) after sending interrupt signals to each sub CPU 103 to 105 (step S206), but it is also possible to simultaneously execute the interrupt signal sending process and the power-cutoff-specific process.

C7. Variation Example 7

With the first embodiment and second embodiment described above, the main CPU 102 (printing control unit) executes comprehensive control of the printer PRT during printing, but instead of the main CPU 102, it is also possible to have any of the sub CPUs 103 to 105 do this.

In this case, with the second embodiment described above, when starting up the printer PRT, it was the main CPU 102 that sent the power-cutoff-specific process program and prescribed data to the sub CPU 103, but instead of the main CPU 102, the sub CPU that does comprehensive control of the printer PRT sends the power-cutoff-specific process program and the prescribed data to a specific CPU.

C8. Variation Example 8

With the first embodiment and second embodiment described above, the control unit 100 was integrated on one semiconductor substrate, but it is also possible to have a constitution with which each constitutional element (the main CPU 102, each sub CPU 103 to 105 or the like) is respectively mounted on an individual semiconductor substrate.

C9. Variation Example 9

The above embodiments are described with the printer PRT as the information processing device, but the present invention is also applicable to other information processing devices equipped with a plurality of CPUs such as a scanner, and a personal computer.

What is claimed is:

1. A multi processor system, comprising:
   a first processor; and
   a plurality of second processors, each of the plurality of second processors being connected to the first processor by a dedicated interrupt signal line, wherein
   the first processor, upon receiving a first interrupt signal indicating a power cutoff event, sends via the dedicated interrupt signal line a second interrupt signal to each of the plurality of second processors, and shifts to a preset low power consumption mode, and
   a specific second processor among the plurality of second processors that receives the second interrupt signal executes a prescribed power-cutoff-specific process while the other second processors that receives the second interrupt signal shift to a preset low power consumption mode.

2. The multi processor system in accordance with claim 1, wherein
   the first processor sends a computer program for executing the power-cutoff-specific process and specific data for use in executing the power-cutoff-specific process to the specific second processor in advance.

3. The multi processor system in accordance with claim 2, further comprising a non volatile memory,
   wherein the power-cutoff-specific process includes a process of storing pre-selected data in the non volatile memory, the pre-selected data being to be used by the multi processor system to operate normally when the multi-processor system next turns on.

4. A method for use in a multi processor system having a first processor, and a plurality of second processors being connected to the first processor by a dedicated interrupt signal line, the method comprising:
   when the first processor receives a first interrupt signal indicating a power cutoff event, sending via the dedicated interrupt signal line a second interrupt signal from the first processor to each of the plurality of second processors,
   shifting the first processor to a preset low power consumption mode when the first processor receives the first interrupt signal, under control of a specific second processor among the plurality of second processors that receives the second interrupt signal, executing a prescribed power-cutoff-specific process, and shifting the other second processors that receives the second interrupt signal to a preset low power consumption mode.

5. The method in accordance with claim 4, further comprising:

sending a computer program for executing the power-cutoff-specific process and specific data for use in executing the power-cutoff-specific process from the first processor to the specific second processor in advance.

6. The method in accordance with claim 4, wherein the step of executing a prescribed power-cutoff-specific process includes:

executing a process of storing pre-selected data in a non volatile memory, the pre-selected data being to be used by the multi processor system to operate normally when the multi-processor system next turns on.

* * * * *